United States Patent
Faul et al.

(10) Patent No.: US 7,364,388 B2
(45) Date of Patent: Apr. 29, 2008

(54) MULTI-LAYER DRILLING TEMPLATE AND METHOD OF DRILLING USING THE TEMPLATE

(75) Inventors: Mario Faul, Harsewinkel-Greffen (DE); Johannes Lübbering, Rheda-Wiedenbrück (DE); Rudolf Mense, Herzebrock-Clarholz (DE)

(73) Assignee: Johannes Luebbering AG/Switzerland, Baar (CH)

( * ) Notice: Subject to any disclaimer, the term of this patent is extended or adjusted under 35 U.S.C. 154(b) by 538 days.

(21) Appl. No.: 10/930,792

(22) Filed: Sep. 1, 2004

(65) Prior Publication Data

US 2006/0013662 A1  Jan. 19, 2006

(30) Foreign Application Priority Data

Jul. 13, 2004  (DE) ............... 20 2004 011 105 U
Jul. 27, 2004  (DE) ............... 20 2004 011 737 U (51) Int. Cl.
*B23B 47/28* (2006.01)
(52) U.S. Cl. .............. 408/115 R; 408/1 R; 408/97
(58) Field of Classification Search ............ 408/1 R, 408/72 R, 72 B, 115 R, 241 B, 115 B, 76, 408/395, 97
See application file for complete search history.

(56) References Cited

U.S. PATENT DOCUMENTS 2,392,804 A * 1/1946 Basolo ................. 264/227
2,417,539 A * 3/1947 Aronson .............. 408/72 R
4,108,566 A * 8/1978 Jones .................. 408/115 R
5,318,394 A * 6/1994 Pierce et al. ........... 408/72 B
7,214,008 B1 * 5/2007 Dods et al. ........... 408/115 R

FOREIGN PATENT DOCUMENTS

| DE | 702918 | * | 1/1941 | |
| DE | 2816909 A1 | * | 10/1979 | |
| DE | 4431952 A1 | * | 3/1996 | |
| GB | 698643 | * | 10/1953 | ............ 408/72 R |

OTHER PUBLICATIONS

Advertisement entitled "Precision Drill Jig Bushings" by Carr Lane, Copyright 1999.

* cited by examiner

*Primary Examiner*—Daniel W. Howell
(74) *Attorney, Agent, or Firm*—Greenblum & Bernstein, P.L.C.

(57) ABSTRACT

Drilling template include a generally planar member comprising at least one mechanism for guiding a drill. The at least one mechanism is structured and arranged to align a drilling machine having the drill. The generally planar member has at least two layers which can more with respect to each other. The drilling template is capable of assuming at least one configuration when the at least two layers are prevented from moving with respect to each other. This Abstract is not intended to define the invention disclosed in the specification, nor intended to limit the scope of the invention in any way.

61 Claims, 8 Drawing Sheets

MULTI-LAYER DRILLING TEMPLATE AND METHOD OF DRILLING USING THE TEMPLATE

CROSS-REFERENCE TO RELATED APPLICATIONS

The present application claims priority under 35 U.S.C. §119 of German Application Nos. 20 2004 011 105.5, filed on Jul. 13, 2004 and 20 2004 011 737.1, filed on Jul. 27, 2004, the disclosures of which are expressly incorporated by reference herein in their entireties.

BACKGROUND OF THE INVENTION

1. Field of the Invention

The invention relates to a drilling template, a method for attaching a drilling template to a three-dimensionally-shaped workpiece and a method of drilling a workpiece with the template.

2. Discussion of Background Information

The use of drilling templates is always advantageous if axial forces occur in the processing of a workpiece which could cause a faulty positioning of the workpiece. This can occur not only during drilling but also, e.g., during grinding or countersinking.

For example, it is known from the field of aircraft construction, when joining several fuselage sections or when attaching the wings, the empennage and the like to a fuselage section, to rivet or screw the members to one another. To prepare the members for this connection, the members are first drilled through. However, in order to ensure an accurately fitting alignment of the drillings of both members to be connected, the members are first joined together and subsequently jointly drilled through. The precise alignment of the drilling sites in this process is ensured by using drilling templates.

A guiding of the drilling machine can be accomplished by means of so-called jig bushings. Known bushings of this type include those made by Carr Lane Manufacturing Co., St. Louis, Mo., USA (www.carrlane.com). Depending on the embodiment used, the jig bushings can be used as standard bushings to position hand-held drills, or to stop drill feed units, i.e., drilling machines with their own feed mechanism. In particular, in the field of aeronautics, no standard templates are known. This is because the complexity of each individual section requires individually designed or custom made templates. This custom nature of the templates applies to the contour or shape of the templates, as well as to the positions of the individual drill sites.

Such known drilling templates are typically metal plates which are milled from a full material block. In most cases, the metal plates have a slightly curved shape in order to conform to the workpiece surface, which usually also has a curved, and thus three-dimensional shape, i.e., they are usually do not have, e.g., a flat surface running in a single plane.

The drilling templates used in practice, on the one hand have the disadvantage that, while they are highly accurate, they need to be made with a three-dimensional production from a material block. This requires considerable financial and technical expense. As a result, such drilling templates are correspondingly expensive.

These drilling templates also have the disadvantage that, although they are manufactured to design specifications with high precision, in practice, however, differences are encountered between the workpiece surface and the surface of the drilling template, and such differences often cannot be ruled out. A subsequent reworking of the drilling template is often required in order to adapt it optimally to the geometry of the workpiece surface actually present. This results in considerable time delay and produces considerable additional expense.

SUMMARY OF THE INVENTION

The invention aims to improve the above-noted deficiencies of the prior art. According to the invention, a generic drilling template is used such that it can be manufactured cost-effectively. The template also makes it possible, in a simple and cost-effective manner, to correct or adjust its geometry so as to adapt it to a workpiece geometry. Furthermore, the invention relates to a method for attaching a drilling template to a workpiece. The use of the cost-effective drilling template ensures an optimal adjustment to the workpiece surface and permits possible corrections to the drilling template geometry.

In other words, the invention proposes a drilling template, not as a solid plate, but instead as a multi-layer planar element. At least two layers are provided thereby. Since each of these two layers forms a surface of the plane element, these two layers are termed face layers. Because the individual layers can be displaced against one another, the multi-layer structure provides for, in a simple manner, flexibility of adjustment and/or contouring. Adjustments to curvatures of workpiece surfaces as they actually exist are therefore possible in a simple manner. Thus, there is no need to use templates having the form of three-dimensionally milled plates manufactured with high precision and adapted to a preset, constructively calculated workpiece geometry, as is the case with conventional drilling templates. Unlike conventional templates, whose fitting accuracy is not established until the first contact with the actual workpiece, the multi-layer flexible plates of the inventive template can be simply prefabricated and provided with the corresponding curvature as needed on the workpiece itself.

The template can provide for a uniform bending radius or it can be arranged with a different bending radius. It can even adapt to changing curve shapes, e.g., it can assume an approximately S-shaped curve course which corresponds to that of the workpiece surface. Apart from this fundamentally flexible manufacturing/assembly method of adapting the drilling template adapted to the desired surface shapes, by using the multi-layer construction and the corresponding displaceability of the individual layers against one another, it is also possible to make any necessary corrections to the shape. Such fine tuning can occur even if faulty fits are established when placing the drilling template on the workpiece. As will be described in detail herein, the drilling template is only finally stiffened after this adjustment to the workpiece has been made.

Additional structural elements can also be provided between the two face layers, e.g., one or more additional layers may be utilized. These additional layers can be intermediate layers or spacer sleeves. By using these additional layers, a greater thickness of the plane element can be achieved in order to ensure better guiding of the drill or of the drilling machine having the drill.

The individual layers can be fixed against displacement, relative to one another, by way of clamps. Such clamps can be, e.g., two-part clamps. In this case, the two parts of the clamps can be screwed together and thereby compress the layers against each other. In order to be able to attach the clamps (which can be arranged in any desired positions on the template and not only on the edge of the drilling template), the two parts of the clamp can interact and/or engage each other like a screw and a nut. They can also extend through corresponding cutouts in the drilling template. The clamps can also feature a full material cross section or they can be embodied as sleeves or bushings which utilize a hollow so as to be formed in a correspondingly weight-saving, manner.

The multi-layer structure allows the individual layers displace against one another, or slide over and relative to each other. However, in order to ensure a reliable alignment of the drill or the drilling machine having the drill, e.g., in order to ensure that the drill is exactly perpendicular to the workpiece surface, jig bushings are provided on the template. These bushings are arranged to extend through the plane element. If a plurality of layers is provided, and cutouts are respectively provided in the layers through which the drill is to extend, the edges of these cutouts will not align precisely with one another. This is especially true when the multi-layer drilling template is curved. By inserting the jig bushing in the drilling template, a smooth guide surface and a correspondingly reliable guidance for the drill or the drilling machine can be ensured.

Moreover, the jig bushings can also function as a clamping mechanism in order to fix or secure the layers against displacement or movement. Of course, the invention contemplates using other devices or arrangements for fixing of the layers against movement. Moreover, the clamps also need not have the arrangement described herein as along as they function in a similar manner.

Advantageously, several jig bushings can be provided on the template, so that in a known manner, through the attachment of a single drilling template, several drilling sites can be preset accurately. Also, the attachment of only one drilling template means that the setting of several drill holes is possible in a time-saving manner. However, through the curvature, deflection or bending of the drilling template, the individual layers of the drilling template are displaced against one another. In view of the arrangement of several jig bushings, in order to avoid twisting or tilted alignments of the jig bushings, cutouts are provided in the layers through which the jig bushings extend. As a result, the free cross sections of the cutouts are larger than that which corresponds to the cross section of the jig bushings. In this way, the freest possible mobility of the individual layers against one another is not impaired through the arrangement of several jig bushings and the drilling template can be bent into the desired curve shape.

However, it is advantageous if one layer is provided that can be termed "reference layer" and that closely surrounds the jig bushings. This ensures a defined position of the jig bushings or also of alignment or attachment elements that are provided on the drilling template and that need to be placed on or attached to defined points of the workpiece.

By forming the cutouts as slots, a specific bending direction of the drilling template can be preset. On the other hand, in the direction running crosswise thereto, the drilling template can maintain a less flexible and accordingly more rigid nature without additional reinforcement measures. Moreover, the slots can also function to protect against torsion of the jig bushings, i.e., prevent the bushings from rotating relative to the template, so that the jig bushings are not, e.g., caused to rotate by the drilling machine or the drill. In order to provide the above-mentioned protection against torsion, the jig bushings advantageously feature an out of round cross section which corresponds to the cutouts, e.g., the bushings may have one or more flattenings or planar areas if the cutouts are embodied as slots.

Advantageously, the jig bushings can be made up of at least two parts wherein one of the parts has the form of a sleeve and on the other has the form of a nut which interacts and/or engages the sleeve. The sleeve can feature a collar with which it rests on the outermost layer of the drilling template and the nut can feature a comparable collar that rests on the other outermost layer, so that by screwing and/or threadably engaging the nut onto the sleeve the two layers can be pressed or compressed against one another. In this manner, the drilling template can be stiffened, since due to the pressure forces, and the resulting friction caused thereby, a displacement of the layers against one another and thus a bending of the drilling template is no longer possible. The above-mentioned protection against torsion of the bushings is also advantageously improved during this screwing procedure. As a result, it is possible to ensure that the sleeve of the jig bushing does not have to be secured when the nut is screwed onto the sleeve.

The arrangement of one or more intermediate layers can be provided between the two face layers so that a plurality of spacer sleeves does not need to be provided between two outermost layers. Instead, the thickness of the drilling template, and thus the spacing of the two outermost layers from one another, can be determined by simple and cost-effective intermediate layers. Whereas the intermediate layers have to be worked, namely have to be provided with cutouts for, e.g., the jig bushings, a reworking of the individual parts necessary for the drilling template can be omitted when the distance between the two face layers is achieved by spacer sleeves. Depending on the size of the drilling template, and depending on the number of jig bushings provided, the drilling template can be made in an economically advantageous manner either with intermediate layers or with spacer sleeves.

If necessary, a combined construction method can also be provided, for through the use of spacer sleeves a free channel is created respectively between adjacent spacer sleeves, so that, e.g., electric cables or hydraulic or pneumatic lines can easily be guided between the two outermost layers of the drilling template, if such a channel is available between spacer sleeves for laying cables or lines.

The jig bushing can preferably have a stopping part at which the drilling machine is stopped. By way of such a stop, it is not only possible to define the angular position of the drilling machine to the drilling template, and thus to the workpiece but also to ensure the maintenance of a preset, defined drilling depth. The stop can be, e.g., a bayonet joint that ensures a defined position of the drilling machine.

In particular, if the jig bushings are embodied in several parts, and the stopping part is embodied on the nut, by using different nuts, even when using otherwise identical sleeves of the jig bushings, the adjustment to different types of drilling machines can be made. This is because the nuts have stopping parts adapted according to the respective drilling machine and the stopping part is thus provided on the jig bushing in an interchangeable manner.

Advantageously, one of the face layers can itself be embodied in several parts and/or layers. The separating line between the individual sections of this respective face layer, on the one hand, renders possible a higher flexibility for correspondingly easier flexibility of the drilling template. Moreover, through this multiple-part structure of the face layer, there is the possibility of embodying and/or of providing the drilling template with differing thicknesses, e.g., which may be beneficial if the template is to be placed on a workpiece surface that has an offset because two workpieces overlap. In this case, the two parts of the multiple-part face layer can have a different spacing from the respectively opposite face layer so that in these two areas of different thickness of the drilling template, e.g., different numbers of intermediate layers or spacer sleeves of different lengths are used.

If spacer sleeves are not used, but rather intermediate layers are used, a cutout running in a channel-like manner or a groove can be provided in one or more of these intermediate layers so that electric wires or lines conducting gas or liquid can be laid through this cutout or this groove. If necessary, gas or liquid can be conducted directly through this channel-shaped cutout in the respective intermediate layer even without the arrangement of additional lines.

Thus, the template can be provided, e.g., to render possible an illumination of the drilling site by way of at least one LED and to have the electric feed line run through such a channel. Alternatively, if the drilling template is to be held onto the workpiece by way of vacuum suction devices, one can guide the vacuum line through such a channel or to use the channel itself as a vacuum line without any additional line. Finally, the template can be configured to bring liquid to the drilling site through such a channel, e.g., so-called "drill milk" that, on the one hand, cools the workpiece and the drill and, on the other hand, transports away any chips.

After stiffening the multi-layer drilling template, e.g., by clamping the jig bushings, in order to rule out an undesirable displacement of the individual layers with respect to one another, the template can be provided to embody the layers in an especially friction-promoting manner, i.e., to embody the surface that is directed towards a surface of an adjacent layer in a correspondingly friction-promoting manner. This can be done, e.g., through coating of the surface with a friction-promoting foreign material, or without any additional material, through a particularly rough embodiment of the surface, i.e., by using a particularly rough surface. Alternatively, provision can be made to provide layers of a particularly friction-promoting material, e.g., of rubber or a rubber-like material that impede the relative movement of the individual layers among themselves as soon as the drilling template is stiffened.

Preferably, the multi-layer drilling template can feature layers of different materials. For example, outermost face layers of metal can be provided, e.g., of steel. When using the above-mentioned jig bushings that rest on the face layers with their collars, steel guarantees a reliable absorption of the clamping forces that occur without undesirable deformations. The intermediate layers can be advantageously made of plastic so that, on the one hand, the lightest possible material is provided that on the one hand is able to easily absorb high pressure forces and that can be easily and cost-effectively worked, e.g., to create cutouts through which the jig bushings extend. PVC, for example, can be used for such intermediate layers.

Moreover, layers can be used of a particularly friction-promoting material, as mentioned above. If necessary, a layer of rigid material, e.g., of steel, can also be used as intermediate layer if a particularly high degree of inherent rigidity of the drilling template is present, e.g., in cases where drillings are to be made under an aircraft wing. In this case, not only has the template to absorb forces that, as pressure forces, try to lift the drilling template from the workpiece during the drilling procedure, but in addition an effect is also exerted by the weight of the drilling template and the drilling machined stopped on it, which can weigh approximately 15 kg. In this case, these weight forces are also trying to distance the drilling template from the workpiece.

As described above, the drilling template can also feature suction cups in order to be held onto the workpiece by vacuum. As mentioned above, the vacuum line can be guided between the two outermost layers to the suction cups. The template can also provide for the vacuum line to be guided at the edge of the drilling template between the two outermost layers, so that no channel needs to be created in between intermediate layers. Instead, in a particularly cost-effective manner, the intermediate layers can feature only smaller outer dimensions than the face layers so that, accordingly, an input chamber open to the side remains on the edge between the two face layers. In this chamber, the vacuum lines or, in the case of other uses for lines, other lines can be laid.

Instead of the above-mentioned multi-part embodiment of a face layer, the flexibility of the template can be improved with the face layer being embodied in one part that is slit and thus more easily flexible than an otherwise identical layer that is not slit.

An optimal coding of the drilling template can also be provided. By way of non-limiting example, when using intermediate layers, the layer adjacent to one face layer is a different color from the face layer. If the face layer is provided with openings at places at which the adjacent intermediate layer has no openings, an optimal optical recognition of codings can be made possible by using different color on the face layer from that of the adjacent intermediate layer.

These codings can have the form of, e.g., in plain language text or numbers, or also have the form of a barcode or machine-readable indicia in another manner, so that through this coding it is e.g., possible to assign and/or designate a specific drilling template to only one specific section of an aircraft or to an individual site on the aircraft where this drilling template is to be used. By inserting different colored sections that, in total, form the intermediate layer adjacent to the face layer, a multi-colored coding can be created with correspondingly high information content.

The proposed method for attaching a drilling template provides, first of all, a way to place one workpiece in a manner known per se on the other workpiece and to align it in its preset alignment. Only then, does one adjust the drilling template to the surface of the workpiece. Through the deformability of the drilling template provided as proposed, such an adjustment to the geometry of the workpiece surface actually present at this point is easily achievable. After this adjustment, the drilling template is stiffened so that a drilling template is now available for use and reuse, i.e., it can be used for this workpiece as well as, if its rigidity is maintained, for a plurality of like or similar workpieces. This is particularly useful in, e.g., the serial production of aircraft for the same site with several aircraft to be produced one after the other.

The stiffening of the drilling template can also take place, e.g., by a hardening mass. The template can thereby be, e.g., produced from several textile layers and utilize a liquid-proof outer casing. As a whole, such a drilling template is called cushion-like, since it has a casing that contains a flexible and relatively freely deformable inner component. This component can be composed of, e.g., a two-component hardening mass, e.g., in the form of synthetic resin and hardener. The drilling template can be deformed during a preset defined reaction time, and subsequently, it can be stiffened by the hardening of the hardening material and no longer deformable.

Another possibility for achieving the stiffening of the drilling template through a hardening mass can also be applied with a multi-layer drilling template: such a drilling template can not only be mechanically braced and stiffened in this manner, but alternatively, e.g., by adhering the individual layers to one another. An adhesive can thus be used, the hardening time of which is known, e.g., a two-component adhesive, so that during this hardening time the drilling template is deformable and can be adjusted to the workpiece, whereas subsequently after the adhesive has hardened it has approximately the same rigidity or strength values as a one-piece drilling template made from solid material.

Alternatively, the template can combine two stiffening possibilities: the drilling template is stiffened, on the one hand, through a mechanical bracing of elements that are movable with respect to one another, e.g., as mentioned above through the screwable jig bushings with a multi-layer drilling template. An additional fixing of the individual layers to one another can be achieved by an adhesive that does not harden until after the completed deformation and adjustment of the drilling template. In this way, the mechanical bracing of the drilling template, by way of the jig bushings, ensures the stability of the shape of the drilling template until after the hardening of the adhesive.

Multi-layer structural elements with layers that can be displaced relative to one another have been known from practice for many years, e.g., in the form of leaf springs with motor vehicles. However the use of a multi-layer plane element in which the individual layers can be displaced relative to one another, and in this manner the entire plane element can be deformed, and the subsequent fixing of the layers in order to hold the plane element in its deformed shape, specifically for the use of a drilling template, and in particular for the field of the production of aircraft, is not known. Compared with a drilling template made three-dimensionally from a material block, the invention provides a substantially quicker, more cost-effective and more precisely adjustable drilling template.

Although the invention has been described with regard to a "drilling template", the template can cover all other uses. For example, such other uses for the template can include, e.g., grinding, reaming, counterboring, countersinking, etc.

The invention also provides for a drilling template comprising a generally planar member comprising at least one mechanism for guiding a drill. The at least one mechanism is structured and arranged to align a drilling machine having the drill. The generally planar member comprises at least two layers which can move with respect to each other. The drilling template is capable of assuming at least one configuration when the at least two layers are prevented from moving with respect to each other.

The generally planar member may comprise a flexible and bendable generally planar member. The at least one mechanism may comprise a clamping mechanism for preventing movement of the at least two layers. The at least one mechanism may comprise a through opening for guiding the drill. The at least one mechanism may comprise a through opening for guiding the drill, a sleeve member and a nut.

The template may further comprise at least one clamping mechanism for preventing movement of the at least two layers. The at least one clamping mechanism may comprise a sleeve member and a nut.

The at least one mechanism may comprise a plurality of clamping devices, each clamping device being arranged to guide the drill and to increase frictional engagement between the at least two layers. The at least one mechanism may comprise jig bushing having a drill guide hole. The jig bushing may comprise a clamping mechanism. Each of the at least two layers may comprise an opening which is larger in cross-section than a cross-section of the at least one mechanism. The at least one mechanism may comprise a plurality of clamping devices and wherein each of the at least two layers comprises a plurality of openings which are larger in cross-section than a cross-section of each of the clamping devices. At least one of the at least two layers may comprise an opening whose cross-section generally corresponds to a cross-section of the at least one mechanism. At least one of the at least two layers may comprise at least one slot. At least one of the at least two layers may comprise at least one slot sized to receive therein the at least one mechanism.

At least one of the at least two layers may comprise at least one slot sized to receive therein the at least one mechanism and another of the at least two layers comprises at least one opening sized to receive therein the at least one mechanism. At least one of the at least two layers may comprise a plurality of through slots, each slot being sized to receive therein the at least one mechanism, and another of the at least two layers comprises a corresponding plurality of openings, each opening being sized to receive therein the at least one mechanism. Each of the at least two layers may comprise at least one slot sized to receive therein the at least one mechanism.

The drilling template may further comprise at least one through slot arranged on at least one of the at least two layers, wherein the at least one through slot comprises one of a non-circular cross-section, at least one D-flat, two parallel edges, and two oppositely arranged flats. The at least one mechanism may comprise a clamping device which includes a first collar that abuts one of the at least two layers and a nut comprising a second collar that abuts another of the at least two layers. The nut may threadably engage a portion of the clamping device and wherein the first and second collars are configured to force the at least two layers towards one another.

The drilling template may further comprise at least one intermediate layer arranged between the at least two layers. The drilling template may further comprise at least one spacer sleeve arranged between the at least two layers. The drilling template may further comprise a plurality of spacer sleeves arranged between the at least two layers.

The at least one mechanism may comprise a jig bushing. The jig bushing may comprise a stop device which is engagable by a drilling machine. The jig bushing may comprise at least one of a removable stop device which is engagable by a drilling machine, an adjustable stop device which is engagable by the drilling machine, and an interchangeable stop device which is engagable by the drilling machine.

One of the at least two layers may comprise multiple parts. One of the at least two layers may comprise at least two layers. The drilling template may further comprise at least one intermediate layer arranged between the at least two layers, wherein the at least intermediate layer comprises one or a notch and a channel. The notch or the channel may be adapted to accommodate one of an electric line, a line conducting a gas, a flowing liquid.

At least one of the at least two layers may comprise one of a high friction surface which faces the other of the at least two layers and a rough surface which faces the other of the at least two layers. At least one of the at least two layers may comprise a high friction coating which faces the other of the at least two layers. Each of the at least two layers may comprise a different material.

The drilling template may further comprise at least one intermediate layer arranged between the at least two layers, wherein each of the at least two layers comprises a stronger material than the at least one intermediate layer. The drilling template may further comprise at least one plastic intermediate layer arranged between the at least two metal layers. The drilling template may further comprise at least one intermediate layer arranged between the at least two layers, wherein each of the at least two layers comprises a thickness that is less than a thickness of the at least one intermediate layer. The drilling template may further comprise at least one intermediate layer arranged between the at least two layers, wherein each of the at least two layers comprises a weaker material than the at least one intermediate layer. The drilling template may further comprise at least one intermediate layer arranged between the at least two layers, wherein each of the at least two layers comprises a lower tensile strength than the at least one intermediate layer. The drilling template may further comprise at least one intermediate layer arranged between the at least two layers, wherein each of the at least two layers comprises a higher tensile strength than the at least one intermediate layer.

The drilling template may further comprise at least one suction suction cup. The drilling template may further comprise at least one vacuum line arranged between the at least two layers and coupled to the at least one suction cup. The drilling template may further comprise at least one vacuum line arranged between the at least two layers. The drilling template may further comprise an intermediate layer of a friction-promoting material arranged between the at least two layers. The friction-promoting material may comprise one of a rubber material and a compressible elastic material.

At least one of the at least two layers may comprise slits which improve flexibility. The drilling template may further comprise at least one intermediate layer arranged between the at least two layers, wherein the at least one intermediate layer comprises slits.

At least one of the at least two layers may comprise metal. The metal may comprise steel. The drilling template may further comprise at least one intermediate layer arranged between the at least two layers, wherein the at least one intermediate layer comprises plastic. The plastic may comprise PVC.

The invention also provides for a method of arranging the drilling template of any type described above on a non-planar surface of a workpiece, wherein the method comprises placing the drilling template on the non-planar surface, aligning the drilling template relative to at least one alignment mechanism, changing a shape of the drilling template, maintaining the shape, and drilling the workpiece.

The invention also provides for a method of arranging a drilling template to a non-planar surface of a workpiece, wherein the method comprises placing the drilling template on the non-planar surface, aligning the drilling template relative to at least one alignment mechanism, changing a shape of the drilling template, and maintaining the shape.

The maintaining may comprise stiffening the drilling template using a hardening mass. The drilling template may comprise a layer configured to receive therein a hardening material. The drilling template may comprise a cushion layer configured to receive therein a hardening material. The drilling template may comprise a plurality of clamping devices configured to maintain the shape. The drilling template may comprise at least two flexible layers and a plurality of devices configured to maintain the shape by preventing movement of the at least two layers with respect to one another. The drilling template may comprise at least two flexible layers and a plurality of fastening devices configured to maintain the shape by preventing movement of the at least two layers with respect to one another. The drilling template may comprise at least two flexible layers and an adhesive layer configured to maintain the shape by preventing movement of the at least two layers with respect to one another.

The invention also provides for a method of drilling a hole using the drilling template of any type described above, wherein the method comprises placing the drilling template against a surface of a workpiece, adapting a shape of the drilling template to a shape of the surface, ensuring that the drilling template to maintains the shape even when it is not in contact with the surface of the workpiece, and guiding the drill into the workpiece with the drilling template.

The invention also provides for a drilling template comprising a bendable multi-layer member comprising at least one mechanism for guiding a drill bit. The at least one mechanism is structured and arranged to guide the drill bit through the multi-layer member. The bendable multi-layer member comprising at least two flexible and bendable generally planar members which can slide with respect to each other. The drilling template is capable of maintaining at least one bent configuration when the at least two generally planar members are prevented from sliding with respect to each other.

Other exemplary embodiments and advantages of the present invention may be ascertained by reviewing the present disclosure and the accompanying drawing.

BRIEF DESCRIPTION OF THE DRAWINGS

The present invention is further described in the detailed description which follows, in reference to the noted plurality of drawings by way of non-limiting examples of exemplary embodiments of the present invention, in which like reference numerals represent similar parts throughout the several views of the drawings, and wherein.

DETAILED DESCRIPTION OF THE PRESENT INVENTION

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description taken with the drawings making apparent to those skilled in the art how the several forms of the present invention may be embodied in practice.

Figure 1:
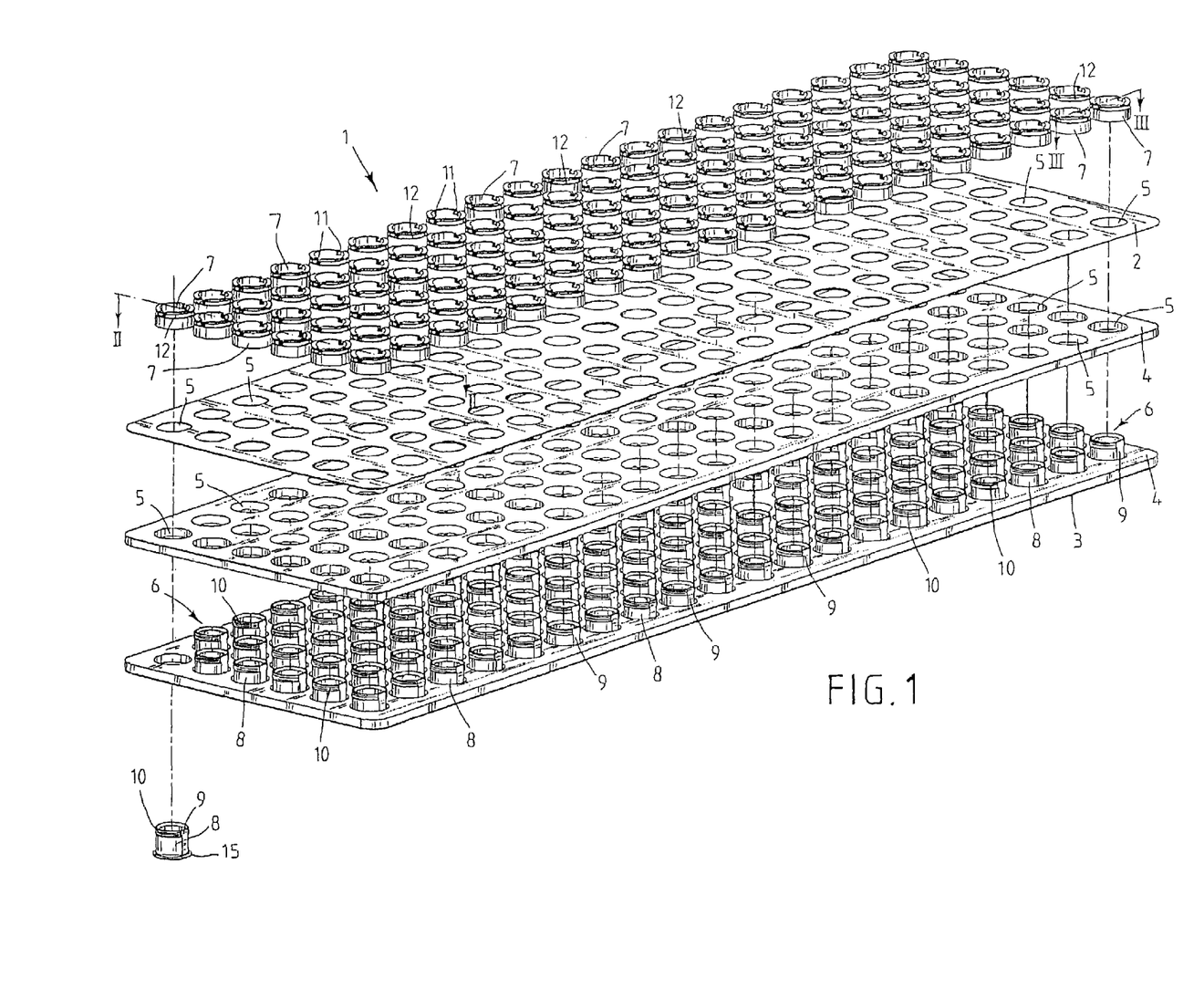
FIG. 1 shows a diagrammatic view of a drilling template for which the individual layers are pulled apart.

As can be seen in FIG. 1, the drilling template 1 includes an outermost upper face layer 2 and an opposite lower outer face layer 3. At least one intermediate layer 4 is arranged between the two face layers 2 and 3. The two face layers 2 and 3 are made of steel, whereas the intermediate layers 4 are made of a PVC plastic, and have a much greater layer thickness than the two face layers 2 and 3.

All the layers 2, 3 and 4 of the drilling template 1 are provided with a plurality of cutouts or through openings 5. Purely by way of non-limiting example, the cutouts 5 are arranged uniformly and distributed over virtually the entire surface of the drilling template 1. Of course, a considerably smaller number of cutouts 5 can also be provided and these openings need not be oriented uniformly. Such openings 5 can, in particular, be arranged only wherever drill holes are needed so that the drilling template 1 will have the correct corresponding openings needed to guide the drill. Other openings can be provided at places at which, if necessary, the drilling template 1 is to be aligned to the correct position to the workpiece with the aid of elements e.g., such elements having the form of e.g., pins, screws, clamps or the like and being capable of extending through the drilling template 1 to or from the workpiece.

Figures 2, 2A, 3:
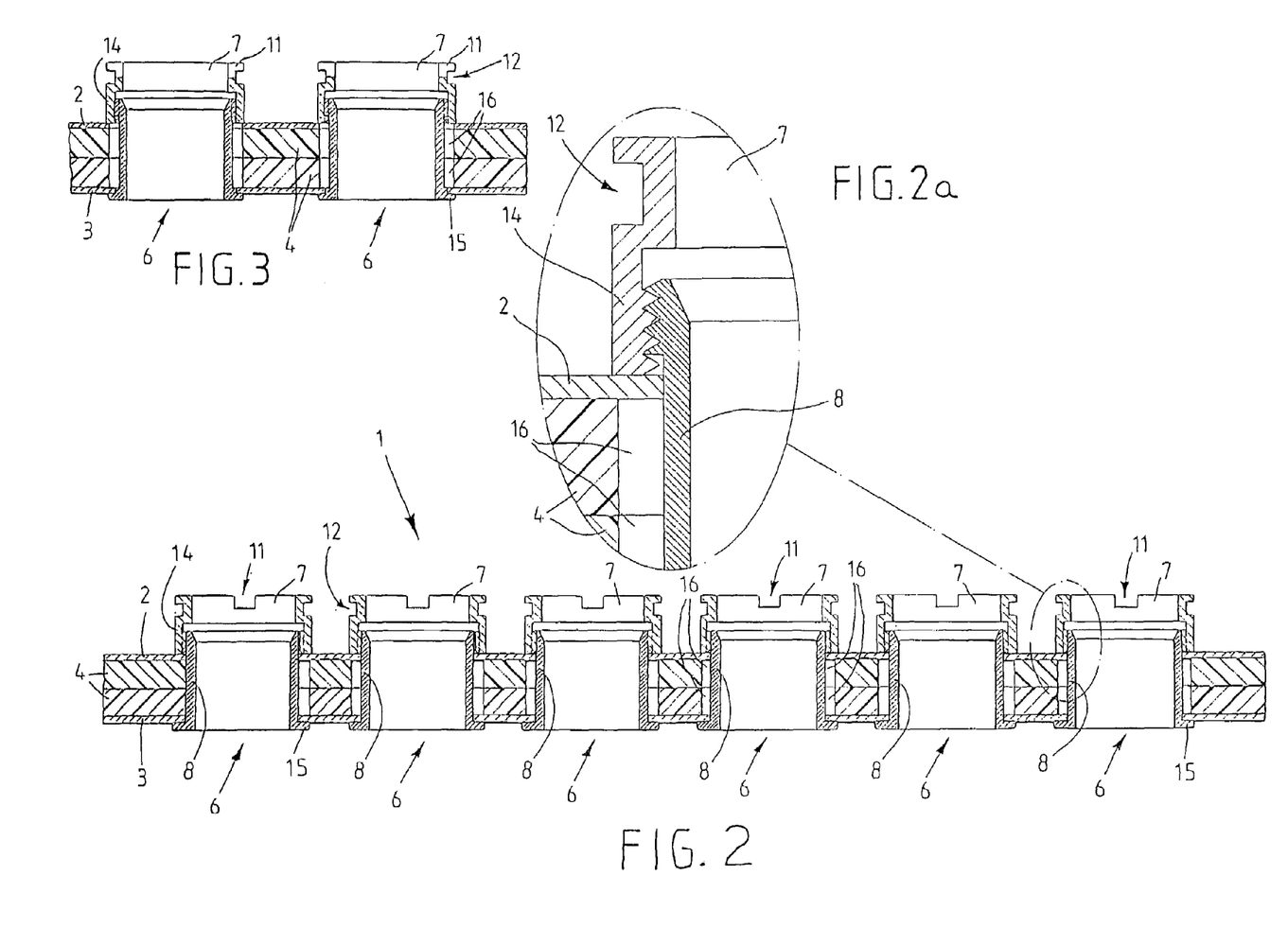
FIG. 2 shows cross section through the drilling template of FIG. 1 along the line II-II.
FIG. 2a shows an enlarged portion of FIG. 2.
FIG. 3 shows a cross section through the drilling template of FIG. 1 along the line III-III.

In the exemplary embodiment shown in FIGS. 1-3, a plurality of jig bushings 6 is inserted in the cutouts 5. These bushings 6 are respectively as having two parts. As can be seen in FIG. 1, nuts 7 can be arranged above the upper face layer 2, which nuts respectively form one part of a jig bushing 6. Lower sleeves 8 of the jig bushings 6 can be respectively inserted in the lower face layer 3. As can be seen in the far left of FIG. 1, the sleeve 8 (which is shown at a distance from the lower face layer 3) can be inserted from the bottom layer 3, through the intermediate layers 4 and through the upper layer 2. It can be seen from the lowest intermediate layer 4, that the cutouts 5 have a larger cross section and/or open area than an outer diameter of the sleeve-like parts 8. In this way, a gap is respectively created between the sleeve-like part 8 and the surrounding layers 2-4. The cutouts 5 are generally circular in the intermediate layers 4, as FIG. 1 shows, and as the spacing of uniform size around the sleeves 8 in FIGS. 2 and 3 shows. In contrast, the lower face layer 3, which serves as a reference layer, has cutouts 5 that rest against the sleeves 8 so that the sleeves 8 are located at defined points within the drilling template 1 and are held there movement-free. The upper face layer 2 has cutouts 5 that rest against the sleeves 8 crosswise to the longitudinal direction of the drilling template, but in the longitudinal direction leave a free space or gap to the sleeves 8.

It is clear, in particular, from a comparison of FIGS. 2 and 3 that the upper face layer 2 has slots as cutouts 5 that are brought right up to the jig bushings 6 in the crosswise direction (FIG. 2), thus right up to the sleeves 8, whereas in the longitudinal direction a gap to the sleeves 8 remains in each case (FIG. 3). A gap 16 is also provided between the intermediate layers 4 and the sleeves 8 of the jig bushings 6. In this manner, the drilling template 1 can be curved or bent in the longitudinal direction and optimally adjusted to the surface shape of the workpiece. Although not shown, through slits can be provided in the upper face layer 2, or other configurations of the cutouts 5 can be utilized in the upper face layer 2 in order to improve or increase the flexibility of the drilling template 1. The slits or cutouts can be provided to ensure flexibility in both directions or only in the crosswise direction of the drilling template 1.

The sleeves 8 and the cutouts 5 of the face layers 2 and 3 are not exactly circular in each case, but have oppositely arranged lateral flattenings or straight areas that correspond to the flattened areas 9 of the sleeve 8 (See FIG. 1). The upper ends of the sleeves 8 include an external thread 10 that is interrupted by the flattened areas 9. By utilizing the flattened areas 9 on the sleeves 8 and the likewise flattened areas on the cutouts 5 (i.e., as slots), the jig bushings 6 can be mounted to the layers 2-4 in a torsion-proof manner, i.e., the engagement of the flattened areas 9 of the sleeve with those of the cutouts 5 ensures that the bushings 6 do not rotate relative to the layers 2 and 3 of the drilling template 1.

The nuts 7 can thus be screwed and/or threaded onto the sleeves 8 without it being necessary to hold the sleeves 8 from rotating. Instead, the sleeves 8 are automatically fixed in a torsion-proof manner via the layers 2 and 3 of the drilling template 1. In this manner, the side of the drilling template 1 shown at the bottom in the drawings that is provided for contacting the workpiece surface is prevented from being inadvertently damaged, which could otherwise not be ruled out, e.g., with counterholding the sleeve-like parts 8. That is, tools typically used to prevent counter-rotation of bushings can produce burrs on the bushing and these burrs can in-turn damage the workpiece. Such tools are not required with the template 1 shown in FIGS. 1-3.

The nuts 7 have in their upper circular edge two indents, recesses, or groove 11 that are used for mating and/or engagement with a screwing tool. Furthermore, the nuts 7 have above their upper edge, as can be seen in particular in FIGS. 2 and 3, a circular groove 12 that is used to stop a drilling tool that has, e.g., correspondingly embodied holding claws (not shown). When it is required to accommodate different drilling tools, the nut 8 can be embodied differently from the exemplary embodiment shown in order to provide any required corresponding stopping arrangement for securing the drilling machine.

Each nut 7 has a circular collar 14 arranged under the groove 12. The collar 14 serves to rest against the upper face layer 2. The collar 14 has an internal thread which threadably engages the external thread 10 of the sleeve 8. The sleeve 8 has a similar circular collar or flange 15 arranged on the opposite end of the jig bushing 6. In this way, the layers 2, 3 and 4 of the drilling template 1 can be secured, braced and compressed between these two collars 14 and 15. The jig bushing 6 is thus used, not only for stopping and guiding the drilling machine, but also as a clamp in order to secure layers 2 and 3 to one another in a non-displaceable manner.

When one desires to use or install the drilling template 1, the nuts 7 are first tightened with a very low torque. This way the individual layers 2, 3 and 4 remain displaceable to a certain extend with respect to one another. After the drilling template 1 has been bent in the longitudinal direction, and optimally adjusted to the surface shape of the workpiece, all the nuts 7 are tightened, with much greater torque in this optimally adjusted shape, onto the sleeves 8 of the jig bushings 6. As a result, the various layers become fixed to one another and the layers 2, 3 and 4 are firmly braced with one another. In this manner, one can be assured that the drilling template 1 retains its now adjusted shape.

Of course, changes in shape of the drilling template 1 are still possible by loosening the nuts 7, readjusting the drilling template 1 to the workpiece shape, and subsequently tightening the nuts 7. Thus, with the aid of the proposed drilling template 1 corrections can be made in a very cost-effective manner and, e.g., the drilling template 1 can be adjusted to slightly different individual pieces of a series of theoretically identical workpieces. However, even without the possibility of making corrections afterwards if, e.g., such as if the layers of the drilling template 1 are firmly connected to one another by adhesion, a very cost-effective production of a drilling template still results compared to a drilling template which is milled from a material block. And, unlike the conventional templates, it is possible to adjust the drilling template exactly to the workpiece's actual shape so that the exact fit of the drilling template 1 on the workpiece is ensured in every case.

Figure 4:
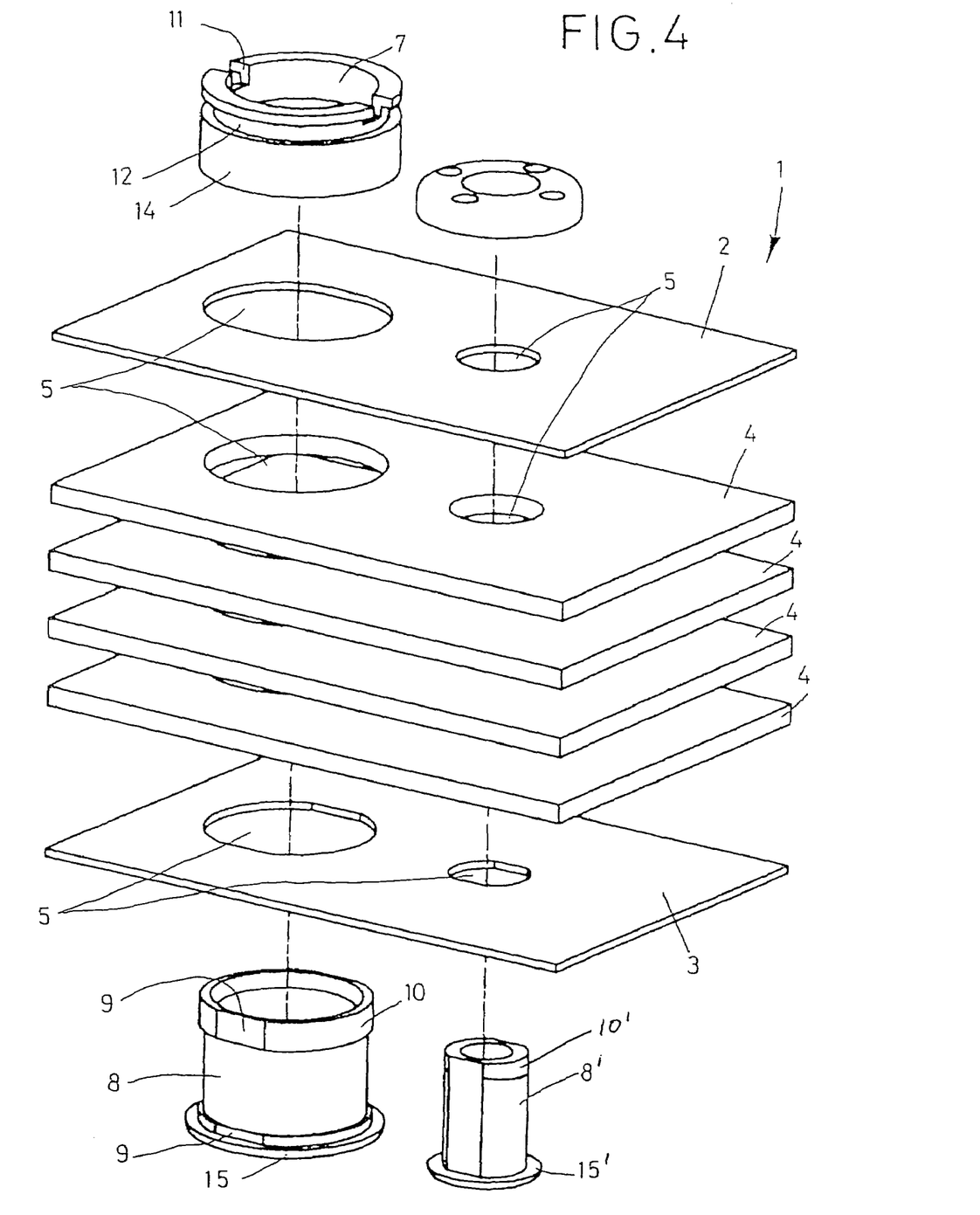
FIG. 4 shows a perspective view of a second drilling template with two different clamps.
Figure 5:
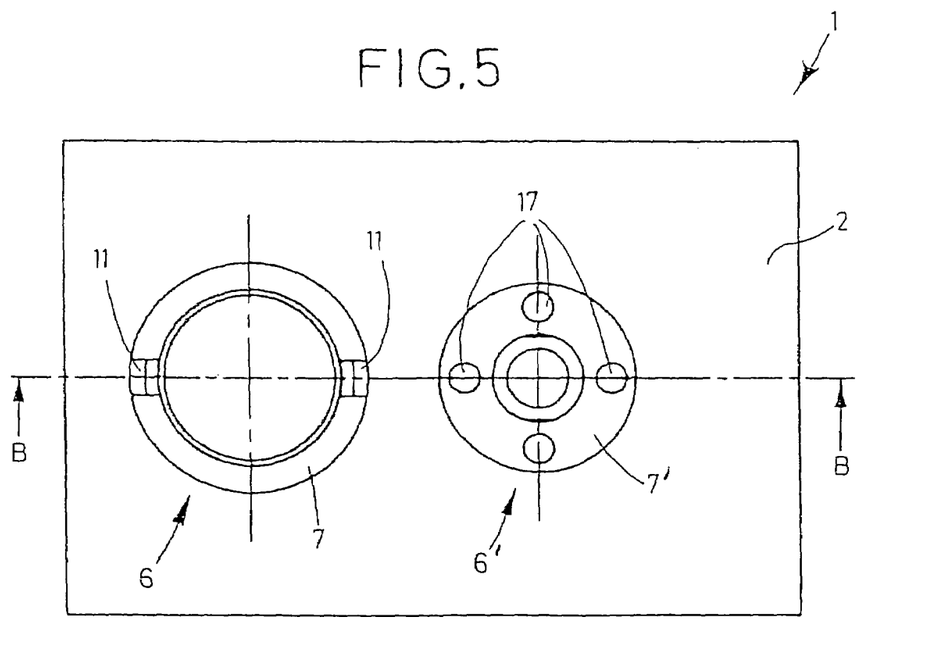
FIG. 5 shows a plan view of the second drilling template from FIG. 4.
Figure 6:
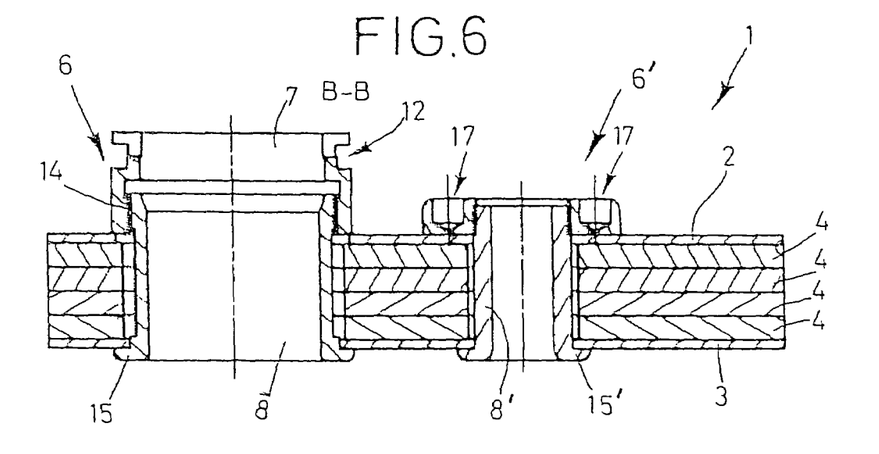
FIG. 6 shows a cross section through the second drilling template from FIG. 5 along the line B-B.

FIGS. 4 through 6 show a second exemplary embodiment of a drilling template 1. Identical parts or parts acting in an identical manner are given the same reference numbers as in the first exemplary embodiment in FIGS. 1-3. The drilling template 1 of FIGS. 4 through 6 is shown, merely by way of non-limiting example, to have only two clamps. One clamp is embodied as a jig bushing 6 and the other clamp as a so-called blind clamp 6'. The second clamp 6' has no other function than to fix layers 2-4 in a non-displaceable manner. The blind clamp 6' is fundamentally designed in a similar manner to a jig bushing 6, and to save weight can also be provided with the form of a hollow sleeve 8'. Preferably, it has a smaller diameter than sleeve 8. The nut 7' need not require a additional collar and, instead of two indents, utilizes four coaxial boreholes 17 for engaging with screwing tool. As with the previous embodiment, the layers 2-4 are fixed between the nut 7 and a collar 15' provided on the sleeve 8'.

In particular, if the drill sites on the workpiece are spaced relatively far apart, the blind clamps 6' can be used to reliably stiffen the drilling template 1 in the areas in which no jig bushings 6 are provided. They are constructed smaller and more simply, and can therefore be manufactured more cost-effectively than the jig bushings 6. They can also require smaller cutouts 5 in the layers 2-4 of the drilling template 1.

Although not shown, the blind clamps 6' can also have the form of a solid threaded pin instead of the hollow sleeve 8. Of course, the blind clamps 6' can also fulfill additional functions if they have the form of a hollow sleeve 8, e.g., they can hold a positioning pin that is placed on a reference point of the workpiece so that with the aid of these positioning pins, or other positioning aids, the drilling template 1 can be aligned correctly on the workpiece before it is fixed on the workpiece.

Figure 7:
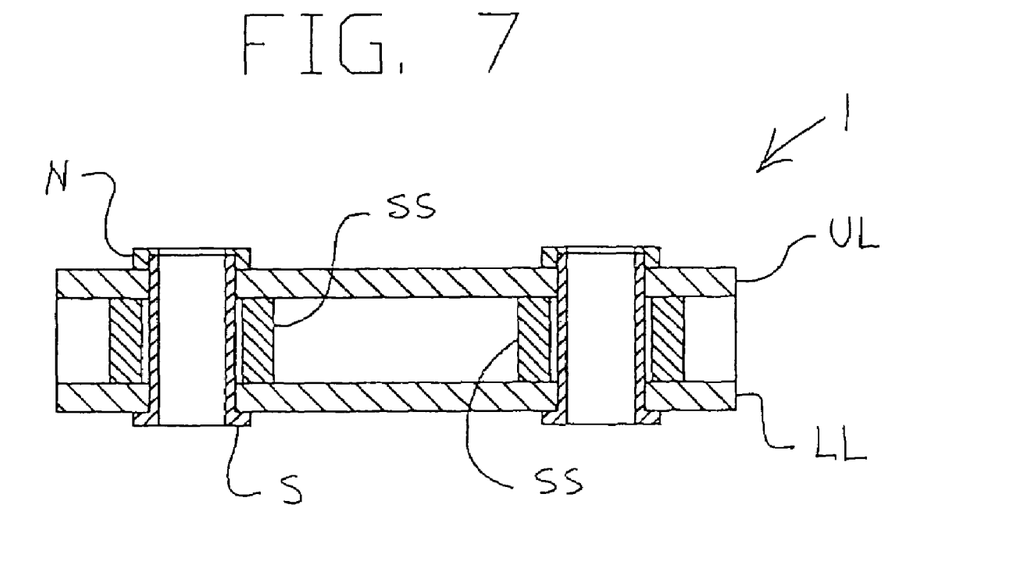
FIG. 7 shows a cross section of another embodiment of the template utilizing spacer sleeves in place of intermediate layers.

In the exemplary embodiment shown in FIG. 7, a plurality of jig bushings are inserted in cutouts. These bushings can also have two parts. As can be seen in FIG. 7, nuts N can be arranged above the upper face layer UL, which nuts N respectively form one part of a jig bushing. Sleeves S of the jig bushings can be respectively inserted in the lower face layer LL. The sleeve S can be inserted from the bottom layer LL, through intermediate spacers or spacer sleeves SS (which can be cylindrical in shape) and through the upper layer UL. As with the previous embodiments, the cutouts or openings in the upper layer UL and lower layer LL can have a larger cross section and/or open area than an outer diameter of the sleeve-like parts S. In this way, a gap is respectively created between the sleeve-like part S and the surrounding layers UL and LL. The openings of the spacer sleeves S are generally circular and have a spacing of uniform size around the sleeves S. In contrast, the lower face layer LL, which serves as a reference layer, has cutouts that rest against the sleeves S so that the sleeves S ate located at defined points within the drilling template 1 and are held there movement-free. The upper face layer UL has cutouts that rest against the sleeves S crosswise to the longitudinal direction of the drilling template, but in the longitudinal direction may have a free space or gap between the cutouts of the layer UL and the sleeves S. As with the previous embodiments, the sleeves S can have oppositely arranged flattened or planar areas which engage with corresponding areas in the cutouts of the layers UL and LL.

Figure 8:
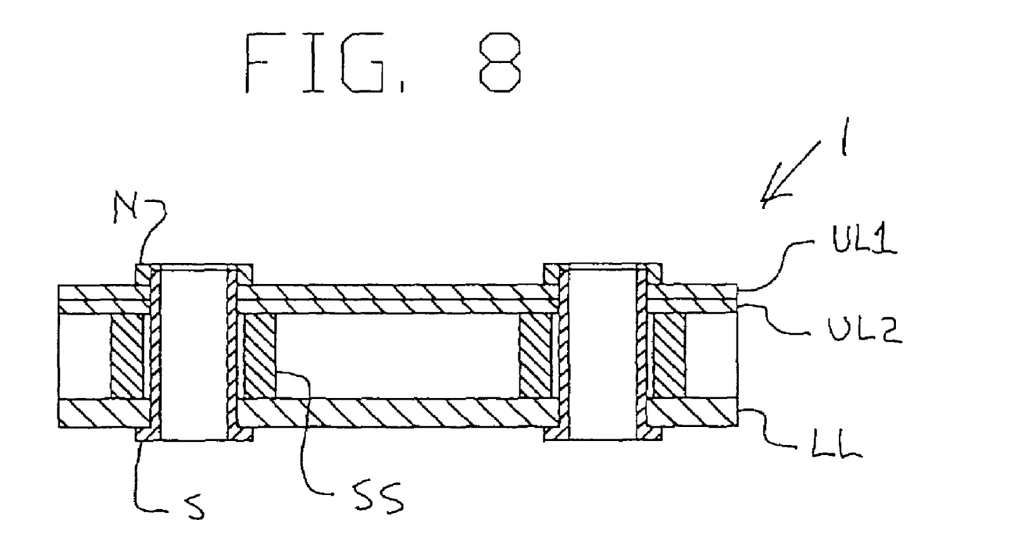
FIG. 8 shows a cross section of another embodiment of the template utilizing spacer sleeves and multiple layers in one of the face layers.

In the exemplary embodiment shown in FIG. 8, a plurality of jig bushings are again inserted in cutouts of the upper UL and lower layer LL. However, unlike the embodiment shown in FIG. 7, the embodiment in FIG. 8 uses a two layer upper layer UL, i.e., a first upper layer UL1 and a second upper layer UL2. The bushings can also have two parts. As can be seen in FIG. 8, nuts N can be arranged above the upper face layer UL, which nuts N respectively form one part of a jig bushing. Sleeves S of the jig bushings can be respectively inserted in the lower face layer LL. The sleeve S can be inserted from the bottom layer LL, through intermediate spacers or spacer sleeves SS (which can be cylindrical in shape) and through the upper layers UL1, UL2. As with the previous embodiments, the cutouts or openings in the upper layers UL1 and UL2, and in lower layer LL can have a larger cross section and/or open area than an outer diameter of the sleeve-like parts S. In this way, a gap is respectively created between the sleeve-like part S and the surrounding layers UL1, UL2, and LL. The openings of the spacer sleeves S are generally circular and have a spacing of uniform size around the sleeves S. In contrast, the lower face layer LL, which serves as a reference layer, has cutouts that rest against the sleeves S so that the sleeves S are located at defined points within the drilling template 1 and are held there movement-free. The upper face layer UL has cutouts that rest against the sleeves S crosswise to the longitudinal direction of the drilling template, but in the longitudinal direction may have a free space or gap between the cutouts of the layer UL and the sleeves S. As with the previous embodiments, the sleeves S can have oppositely arranged flattened or planar areas which engage with corresponding areas in the cutouts of the layers UL1, UL2, and LL.

Figure 9:
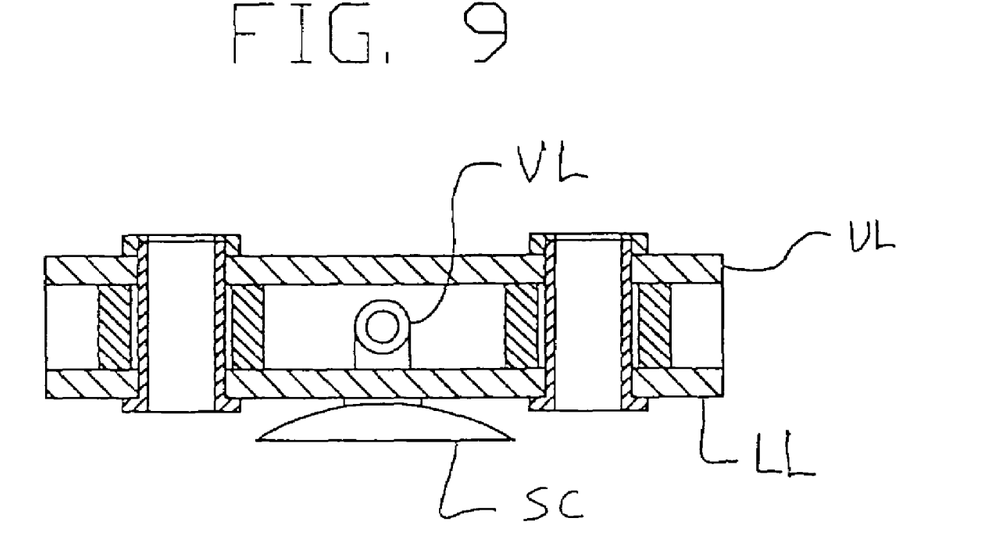
FIG. 9 shows a cross section of another embodiment of the template utilizing suction cups and a vacuum line within the template.
Figure 10:
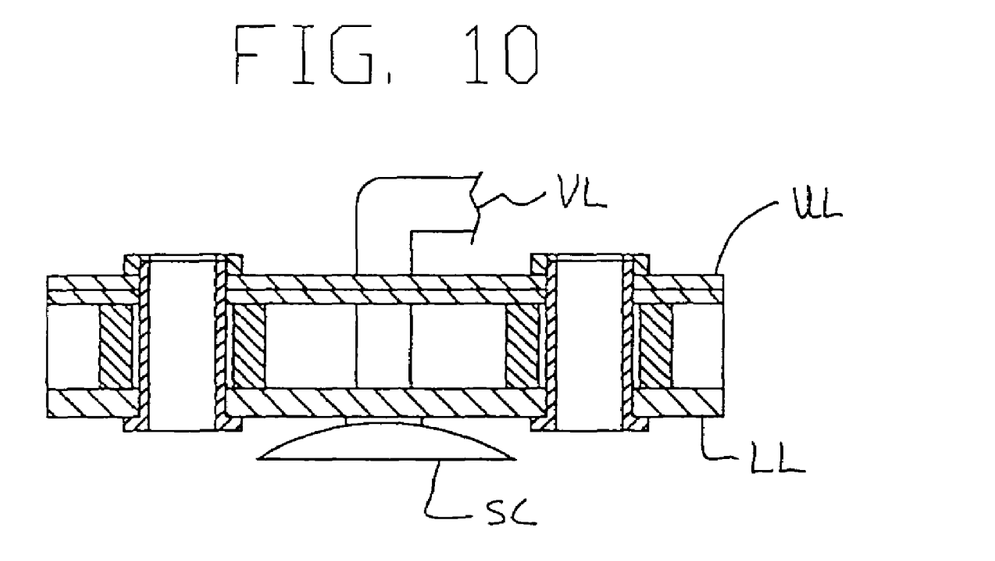
FIG. 10 shows a cross section of another embodiment of the template utilizing suction cups and a penetrating vacuum line.

FIGS. 9 and 10 show various ways in which one or more suction cups CS can be mounted to the lower layer LL of FIGS. 7 and 8. Of course, the suction cups SC can also be arranged on any of the embodiments disclosed herein. In FIG. 9, the vacuum line VL travels between the two layers UL and LL and communicates with the suction cups SC through the lower layer LL. In FIG. 10, the vacuum line VL travels through the two layers UL and LL and communicates with the suction cups SC through both the upper layer UL and the lower layer LL.

Figure 11:
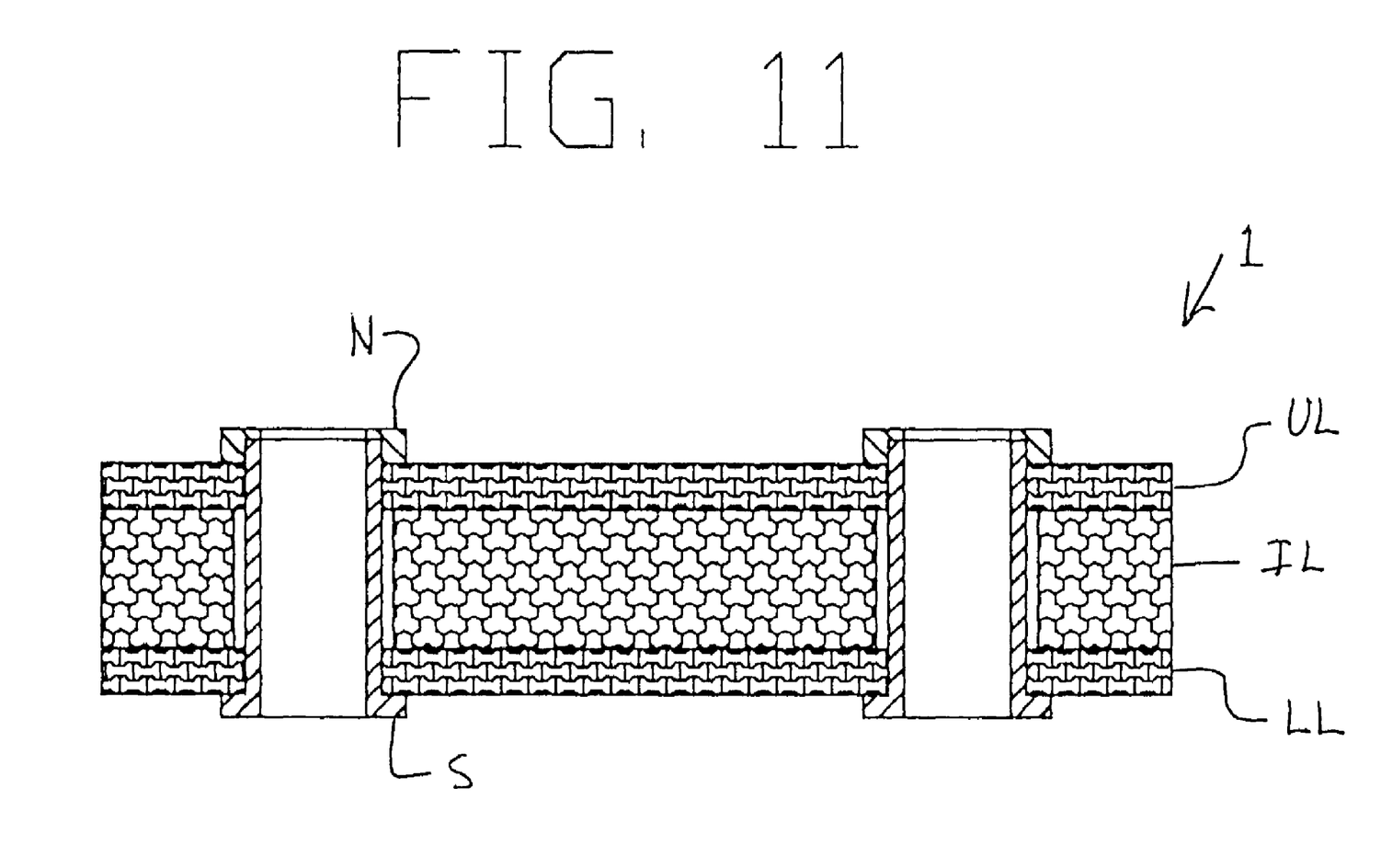
FIG. 11 shows a cross section of another embodiment of the template utilizing a porous intermediate layer.

In the exemplary embodiment shown in FIG. 11, a plurality of jig bushings are inserted in cutouts in the layers UL, IL and LL. These bushings can also have two parts. As can be seen in FIG. 11, nuts N can be arranged above the upper face layer UL, which nuts N respectively form one part of a jig bushing. Sleeves S of the jig bushings can be respectively inserted in the lower face layer LL. The sleeve S can be inserted from the bottom layer LL, through the intermediate layer IL, and through the upper layer UL. As with the previous embodiments, the cutouts or openings in the upper layer UL and lower layer LL can have a larger cross section and/or open area than an outer diameter of the sleeve-like parts S. In this way, a gap is respectively created between the sleeve-like part S and the surrounding layers UL and LL. The openings of the intermediate layer IL are generally circular and have a spacing of uniform size around the sleeves S. In contrast, the lower face layer LL, which serves as a reference layer, has cutouts that rest against the sleeves S so that the sleeves S are located at defined points within the drilling template 1 and are held there movement-free. The upper face layer UL has cutouts that rest against the sleeves S crosswise to the longitudinal direction of the drilling template, but in the longitudinal direction may have a free space or gap between the cutouts of the layer UL and the sleeves S. As with the previous embodiments, the sleeves S can have oppositely arranged flattened or planar areas which engage with corresponding areas in the cutouts of the layers UL and LL. However, unlike the previous embodiments, the template 1 shown in FIG. 11 is designed to function is a cushion-like manner. That is, utilizes a porous intermediate layer IL, which can be made of, e.g., a textile material, and also porous upper and lower layers UL, LL. The porous layers UL, IL and LL can be filled with a hardenable mass so as to solidify the template 1. In this way, the layers of the template 1 can bonded together to form a rigid template 1 after it has assumed the desired shape. Acceptable materials for the hardenable mass include e.g., a resin and a hardener or a material which can harden under UV light. The layers UL and LL can also be transparent and/or translucent. As an alternative, the layers UL, IL, and LL can be non-porous, e.g., made of steel or PVC, and an adhesive can be used between the opposing surfaces of layers UL and IL and between the opposing surfaces of layers IL and LL. In this way, the layers of the template can bonded together to form a rigid template 1 after it has assumed the desired shape. The embodiment of FIG. 11 can also function without the jig bushings having the form of clamps. Instead, grill guiding openings can be provided in the template 1 and/or such openings can be lined with bushings sleeves, e.g., metal sleeves, which do not also include protruding shoulders, i.e., the sleeves would be flush with or slightly recessed from outer surfaces of the two outer layers UL and LL.

Figure 12:
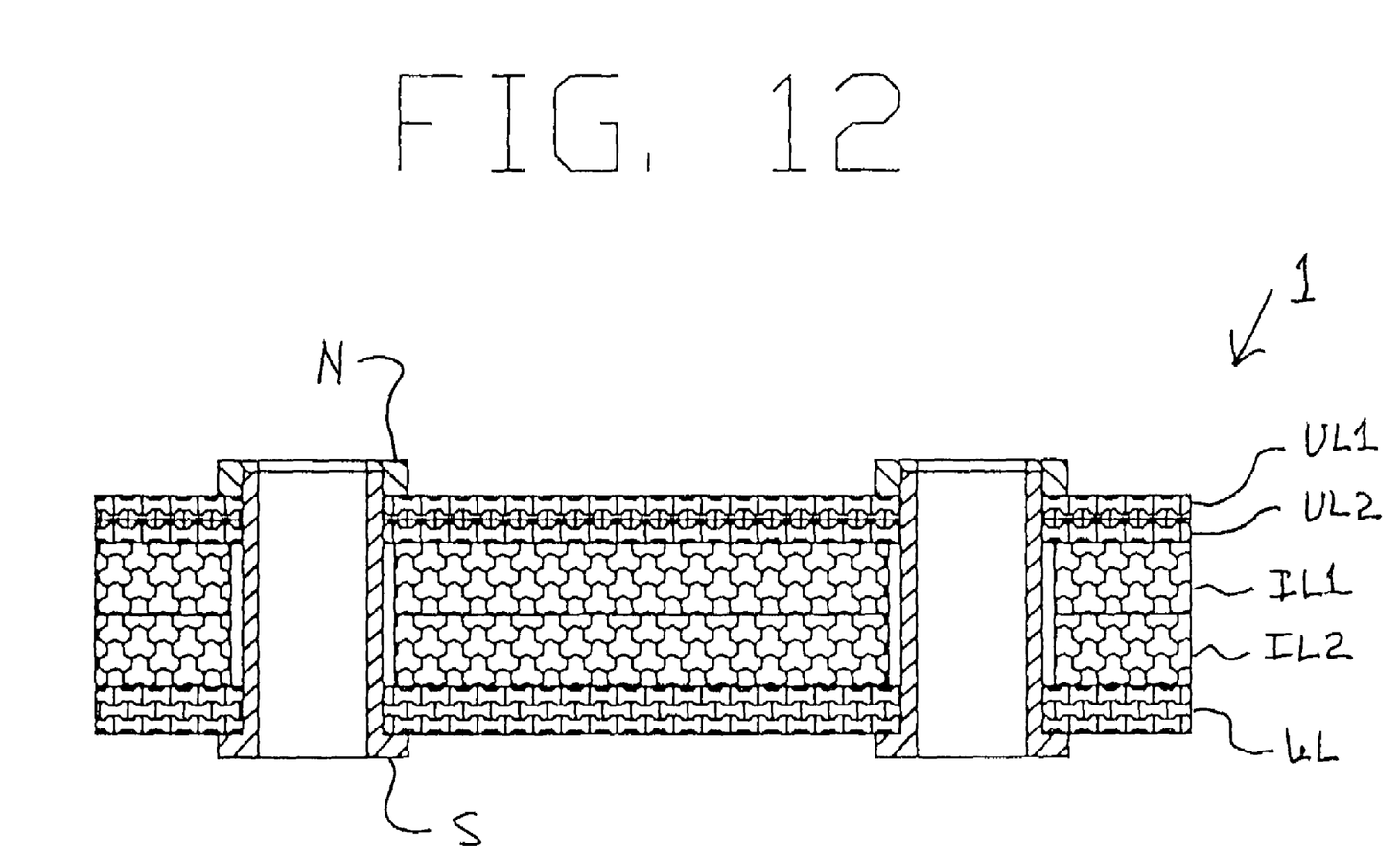
FIG. 12 shows a cross section of another embodiment of the template utilizing a multiplayer outer layer and a plurality of porous intermediate layers.

FIG. 12 shows an embodiment similar to that of FIG. 11 and further includes a two layer upper layer UL1 and UL2 and a two layer intermediate layer IL1 and IL2. This embodiment can otherwise include all of the features described with regard to FIG. 11. Moreover, the embodiments shown in FIGS. 11 and 12 can also include features of the other embodiment described herein such as, e.g., one or more suction cups mounted to the lower layer LL.

It is noted that the foregoing examples have been provided merely for the purpose of explanation and are in no way to be construed as limiting of the present invention.

While the present invention has been described with reference to an exemplary embodiment, it is understood that the words that have been used are words of description and illustration, rather than words of limitation. Changes may be made, within the purview of the appended claims, as presently stated and as amended, without departing from the scope and spirit of the present invention in its aspects. Although the invention has been described herein with reference to particular means, materials and embodiments, the invention is not intended to be limited to the particulars disclosed herein. Instead, the invention extends to all functionally equivalent structures, methods and uses, such as are within the scope of the appended claims.

What is claimed:

1. A drilling template comprising:
a generally planar member comprising at least one mechanism for guiding a drill;
the at least one mechanism being structured and arranged to align a drilling machine having the drill; and
the generally planar member comprising at least two layers which can move with respect to each other,
wherein the drilling template is capable of assuming at least one configuration when the at least two layers are prevented from moving with respect to each other,
wherein the at least one mechanism comprises a clamping mechanism for preventing movement of the at least two layers.

2. The drilling template of claim 1, wherein the generally planar member comprises a flexible and bendable generally planar member.

3. A drilling template comprising:
a bendable multi-layer member comprising at least one mechanism for guiding a drill bit;
the at least one mechanism being structured and arranged to guide the drill bit through the bendable multi-layer member;
the bendable multi-layer member comprising at least two flexible and bendable generally planar members which can slide with respect to each other,
wherein the drilling template is capable of maintaining at least one bent configuration when the at least two flexible and bendable generally planar members are prevented from sliding with respect to each other, and
wherein the at least one mechanism comprises a clamping mechanism for preventing movement of the at least two flexible and bendable generally planar members.

4. The drilling template of claim 1, wherein the at least one mechanism comprises a through opening for guiding the drill.

5. A drilling template comprising:
a generally planar member comprising at least one mechanism for guiding a drill;
the at least one mechanism being structured and arranged to align a drilling machine having the drill; and
the generally planar member comprising at least two layers which can move with respect to each other,
wherein the drilling template is capable of assuming at least one configuration when the at least two layers are prevented from moving with respect to each other, and
wherein the at least one mechanism comprises a through opening for guiding the drill, a sleeve member and a nut.

6. The drilling template of claim 1, further comprising at least one clamping device for preventing movement of the at least two layers.

7. The drilling template of claim 6, wherein the at least one clamping device comprises a sleeve member and a nut.

8. A drilling template comprising:
a generally planar member comprising at least one mechanism for guiding a drill;
the at least one mechanism being structured and arranged to align a drilling machine having the drill; and
the generally planar member comprising at least two layers which can move with respect to each other,
wherein the drilling template is capable of assuming at least one configuration when the at least two layers are prevented from moving with respect to each other, and
wherein the at least one mechanism comprises a plurality of clamping devices, each clamping device being arranged to guide the drill and to increase frictional engagement between the at least two layers.

9. The drilling template of claim 1, wherein the at least one mechanism comprises jig bushing having a drill guide hole.

10. The drilling template of claim 9, wherein the jig bushing comprises the clamping mechanism.

11. A drilling template comprising:
a generally planar member comprising at least one mechanism for guiding a drill;
the at least one mechanism being structured and arranged to align a drilling machine having the drill; and
the generally planar member comprising at least two layers which can move with respect to each other,
wherein the drilling template is capable of assuming at least one configuration when the at least two layers are prevented from moving with respect to each other, and
wherein each of the at least two layers comprises an opening which is larger in cross-section than a cross-section of the at least one mechanism.

12. The drilling template of claim 1, wherein the clamping mechanism comprises a plurality of clamping devices and wherein each of the at least two layers comprises a plurality of openings which are larger in cross-section than a cross-section of each of the clamping devices.

13. The drilling template of claim 1, wherein at least one of the at least two layers comprises an opening whose cross-section generally corresponds to a cross-section of the at least one mechanism.

14. The drilling template of claim 1, wherein at least one of the at least two layers comprises at least one slot.

15. The drilling template of claim 1, wherein at least one of the at least two layers comprises at least one slot sized to receive therein the at least one mechanism.

16. The drilling template of claim 1, wherein at least one of the at least two layers comprises at least one slot sized to receive therein the at least one mechanism and another of the at least two layers comprises at least one opening sized to receive therein the at least one mechanism.

17. The drilling template of claim 1, wherein at least one of the at least two layers comprises a plurality of through slots, each slot being sized to receive therein the at least one mechanism, and another of the at least two layers comprises a corresponding plurality of openings, each opening being sized to receive therein the at least one mechanism.

18. The drilling template of claim 1, wherein each of the at least two layers comprises at least one slot sized to receive therein the at least one mechanism.

19. The drilling template of claim 1, further comprising at least one through slot arranged on at least one of the at least two layers, wherein the at least one through slot comprises one of a non-circular cross-section, at least one D-flat, two parallel edges, and two oppositely arranged flats.

20. A drilling template comprising:
a generally planar member comprising at least one mechanism for guiding a drill;
the at least one mechanism being structured and arranged to align a drilling machine having the drill; and
the generally planar member comprising at least two layers which can move with respect to each other,
wherein the drilling template is capable of assuming at least one configuration when the at least two layers are prevented from moving with respect to each other, and
wherein the at least one mechanism comprises a clamping device which includes a first collar that abuts one of the at least two layers and a nut comprising a second collar that abuts another of the at least two layers.

21. The drilling template of claim 20, wherein the nut threadably engages a portion of the clamping device and wherein the first and second collars are configured to force the at least two layers towards one another.

22. The drilling template of claim 1, further comprising at least one intermediate layer arranged between the at least two layers.

23. A drilling template comprising:
a generally planar member comprising at least one mechanism for guiding a drill;
the at least one mechanism being structured and arranged to align a drilling machine having the drill;
the generally planar member comprising at least two layers which can move with respect to each other; and
at least one spacer sleeve arranged between the at least two layers,
wherein the drilling template is capable of assuming at least one configuration when the at least two layers are prevented from moving with respect to each other.

24. The drilling template of claim 1, further comprising a plurality of spacer sleeves arranged between the at least two layers.

25. The drilling template of claim 1, wherein the at least one mechanism comprises a jig bushing.

26. The drilling template of claim 25, wherein the jig bushing comprises a stop device which is engagable by a drilling machine.

27. The drilling template of claim 25, wherein the jig bushing comprises at least one of a removable stop device which is engagable by a drilling machine, an adjustable stop device which is engagable by the drilling machine, and an interchangeable stop device which is engagable by the drilling machine.

28. The drilling template of claim 1, wherein one of the at least two layers comprises multiple parts.

29. The drilling template of claim 1, wherein one of the at least two layers comprises at least two layers.

30. The drilling template of claim 1, further comprising at least one intermediate layer arranged between the at least two layers, wherein the at least intermediate layer comprises one or a notch and a channel.

31. The drilling template of claim 30, wherein the notch or the channel is adapted to accommodate one of an electric line, a line conducting a gas, a flowing liquid.

32. The drilling template of claim 1, wherein at least one of the at least two layers comprises one of a high friction surface which faces the other of the at least two layers and a rough surface which faces the other of the at least two layers.

33. The drilling template of claim 1, wherein at least one of the at least two layers comprises a high friction coating which faces the other of the at least two layers.

34. The drilling template of claim 1, wherein each of the at least two layers comprises a different material.

35. The drilling template of claim 1, further comprising at least one intermediate layer arranged between the at least two layers, wherein each of the at least two layers comprises a stronger material than the at least one intermediate layer.

36. The drilling template of claim 1, further comprising at least one plastic intermediate layer arranged between the at least two metal layers.

37. The drilling template of claim 1, further comprising at least one intermediate layer arranged between the at least two layers, wherein each of the at least two layers comprises a thickness that is less than a thickness of the at least one intermediate layer.

38. The drilling template of claim 1, further comprising at least one intermediate layer arranged between the at least two layers, wherein each of the at least two layers comprises a weaker material than the at least one intermediate layer.

39. The drilling template of claim 1, further comprising at least one intermediate layer arranged between the at least two layers, wherein each of the at least two layers comprises a lower tensile strength than the at least one intermediate layer.

40. The drilling template of claim 1, further comprising at least one intermediate layer arranged between the at least two layers, wherein each of the at least two layers comprises a higher tensile strength than the at least one intermediate layer.

41. The drilling template of claim 1, further comprising at least one suction cup.

42. The drilling template of claim 41, further comprising at least one vacuum line arranged between the at least two layers and coupled to the at least one suction cup.

43. A drilling template comprising:
a generally planar member comprising at least one mechanism for guiding a drill;
the at least one mechanism being structured and arranged to align a drilling machine having the drill;
the generally planar member comprising at least two layers which can move with respect to each other; and
at least one vacuum line arranged between the at least two layers,
wherein the drilling template is capable of assuming at least one configuration when the at least two layers are prevented from moving with respect to each other.

44. The drilling template of claim 1, further comprising an intermediate layer of a friction-promoting material arranged between the at least two layers.

45. The drilling template of claim 44, wherein the friction-promoting material comprises one of a rubber material and a compressible elastic material.

46. The drilling template of claim 1, wherein at least one of the at least two layers comprises slits which improve flexibility.

47. The drilling template of claim 1, further comprising at least one intermediate layer arranged between the at least two layers, wherein the at least one intermediate layer comprises slits.

48. The drilling template of claim 1, wherein at least one of the at least two layers comprises metal.

49. The drilling template of claim 48, wherein the metal comprises steel.

50. The drilling template of claim 1, further comprising at least one intermediate layer arranged between the at least two layers, wherein the at least one intermediate layer comprises plastic.

51. The drilling template of claim 50, wherein the plastic comprises PVC.

52. A method of using the drilling template of claim 1 on a non-planar surface of a workpiece, the method comprising:
placing the drilling template on the non-planar surface;
aligning the drilling template relative to at least one alignment mechanism;
changing a shape of the drilling template;
maintaining the shape; and
drilling the workpiece.

53. A method of arranging a drilling template to a non-planar surface of a workpiece, wherein the drilling template comprises at least one mechanism for guiding a drill, the at least one mechanism being structured and arranged to align a drilling machine having the drill and comprising a clamping mechanism for preventing movement of the at least two layers, the method comprising:
placing the drilling template on the non-planar surface;
aligning the drilling template relative to at least one alignment mechanism;
changing a shape of the drilling template; and
maintaining the shape.

54. The method of claim 53, wherein the maintaining comprises stiffening the drilling template using a hardening mass.

55. The method of claim 53, wherein the drilling template comprises a layer configured to receive therein a hardening material.

56. The method of claim 53, wherein the drilling template comprises a cushion layer configured to receive therein a hardening material.

57. The method of claim 53, wherein the drilling template comprises a plurality of clamping devices configured to maintain the shape.

58. The method of claim 53, wherein the drilling template comprises at least two flexible layers and a plurality of devices configured to maintain the shape by preventing movement of the at least two layers with respect to one another.

59. The method of claim 53, wherein the drilling template comprises at least two flexible layers and a plurality of fastening devices configured to maintain the shape by preventing movement of the at least two layers with respect to one another.

60. The method of claim 53, wherein the drilling template comprises at least two flexible layers and an adhesive layer configured to maintain the shape by preventing movement of the at least two layers with respect to one another.

61. A method of drilling a hole using the drilling template of claim 1, the method comprising:
placing the drilling template against a surface of a workpiece;
adapting a shape of the drilling template to a shape of the surface; and
ensuring that the drilling template maintains the shape even when it is not in contact with the surface of the workpiece; and
guiding the drill into the workpiece with the drilling template.

* * * * *